(12) United States Patent
Winzinger et al.

(10) Patent No.: US 8,360,492 B2
(45) Date of Patent: Jan. 29, 2013

(54) CHANGEABLE GRIPPING ELEMENT FOR TRANSPORTING CONTAINERS

(75) Inventors: Frank Winzinger, Regensburg (DE); Bernhard Sternkopf, Burglengenfeld (DE); Thomas Hoellriegl, Teublitz (DE)

(73) Assignee: Krones AG, Neutraubling (DE)

( * ) Notice: Subject to any disclaimer, the term of this patent is extended or adjusted under 35 U.S.C. 154(b) by 235 days.

(21) Appl. No.: 12/488,874

(22) Filed: Jun. 22, 2009

(65) Prior Publication Data

US 2010/0013253 A1    Jan. 21, 2010

(30) Foreign Application Priority Data

Jun. 24, 2008   (DE) .......................... 10 2008 029 711

(51) Int. Cl.
*B25J 15/04* (2006.01)
(52) U.S. Cl. ........................................ 294/106; 294/116
(58) Field of Classification Search .................. 294/28, 294/30, 86.4, 203, 90, 106, 116; 198/803.3, 198/803.7, 803.9; 483/1, 69
See application file for complete search history.

(56) References Cited

U.S. PATENT DOCUMENTS

| | | | | |
|---|---|---|---|---|
| 3,885,825 A | * | 5/1975 | Amberg et al. | 294/115 |
| 4,601,637 A | * | 7/1986 | Aviles et al. | 414/739 |
| 4,613,277 A | * | 9/1986 | Guay | 414/729 |
| 4,636,135 A | * | 1/1987 | Bancon | 414/730 |
| 5,256,128 A | * | 10/1993 | Neumann | 483/1 |
| 5,360,249 A | * | 11/1994 | Monforte et al. | 294/119.1 |
| 5,590,923 A | * | 1/1997 | Berger et al. | 294/116 |
| 5,893,700 A | | 4/1999 | Kronseder | |
| 6,612,634 B1 | | 9/2003 | Zoppas | |
| 2005/0269188 A1 | | 12/2005 | Hartness et al. | |
| 2009/0183798 A1 | | 7/2009 | Till et al. | |

FOREIGN PATENT DOCUMENTS

| | | |
|---|---|---|
| DE | 102006012020 A1 | 9/2007 |
| DE | 102006033512 A1 | 1/2008 |
| FR | 2903927 A1 | 1/2008 |
| JP | 59-1187 A | 6/1982 |
| JP | 2005-131718 A | 5/2005 |
| WO | 0076746 A1 | 12/2000 |
| WO | 2007144262 A1 | 12/2007 |
| WO | 2008106922 A1 | 12/2008 |

\* cited by examiner

*Primary Examiner* — Dean Kramer
(74) *Attorney, Agent, or Firm* — Rissman Hendricks & Oliverio, LLP

(57) ABSTRACT

A gripping apparatus for gripping containers may comprise a gripping element which has two gripping parts that can move relative to one another and a carrier on which the gripping parts are arranged. At least one portion of the container to be gripped can be received between these gripping parts. The gripping apparatus may comprise a detachment mechanism for detaching the gripping parts from the carrier, wherein this detachment mechanism can be actuated manually and without the aid of a tool in order to detach the gripping parts from the carrier.

18 Claims, 7 Drawing Sheets

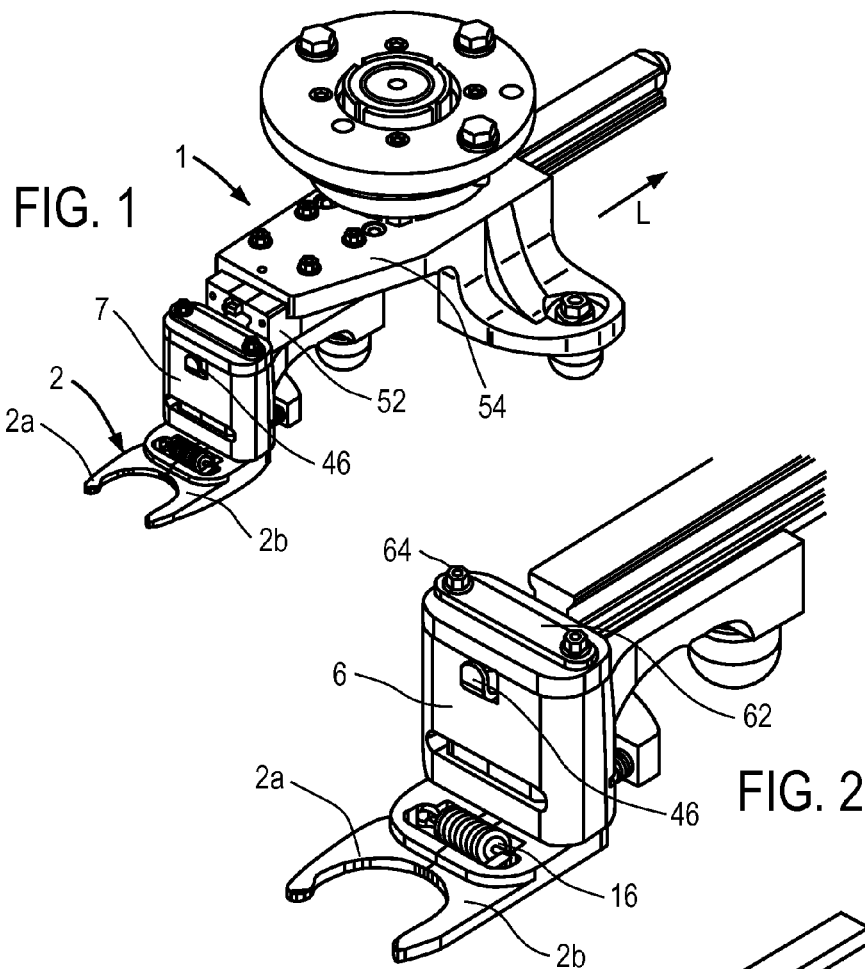
FIG. 1
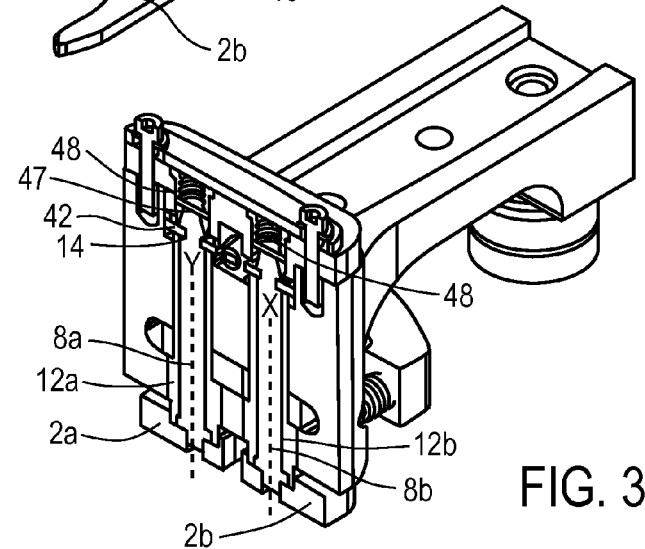
FIG. 2
FIG. 3

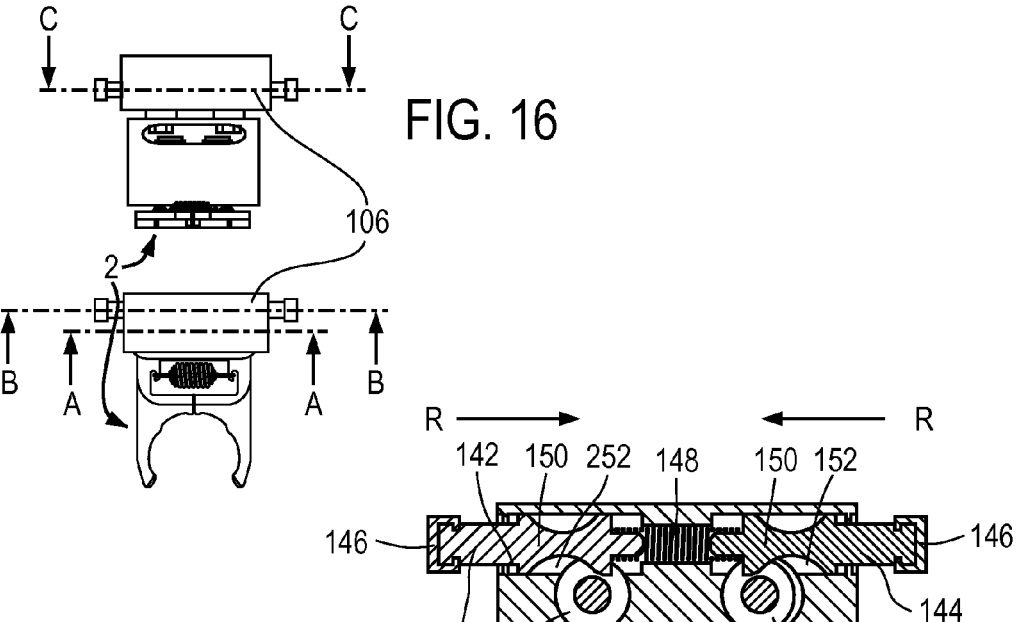
FIG. 16
FIG. 17
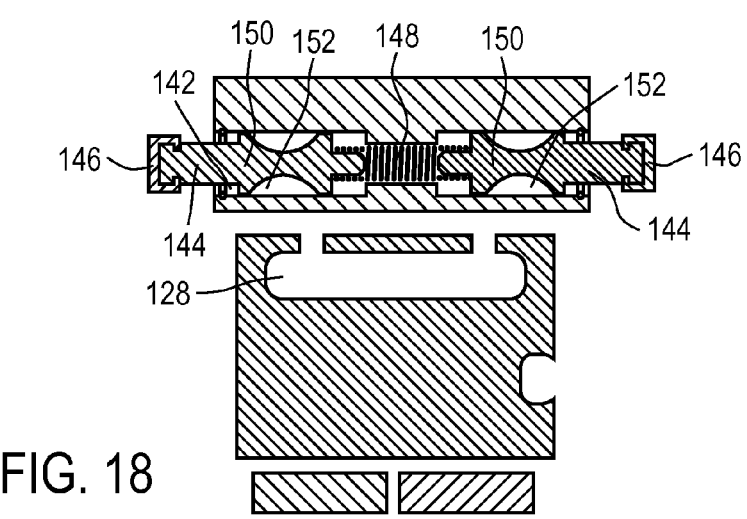
FIG. 18 ized German Patent Application No. 10 2008 029 711.9, filed Jun. 24,
CHANGEABLE GRIPPING ELEMENT FOR TRANSPORTING CONTAINERS

CROSS-REFERENCE TO RELATED APPLICATION

This application claims the benefit of priority of German Patent Application No. 10 2008 029 711.9, filed Jun. 24, 2008, pursuant to 35 U.S.C. 119(a)-(d), the disclosure of which is incorporated herein by reference in its entirety as if fully set forth herein.

TECHNICAL FIELD

The present disclosure relates to a gripping element and a transport device for transporting containers.

BACKGROUND

In the beverage-manufacturing industry, it is customary that, during the production of plastic containers, the latter are conveyed by means of gripping clamps. In this case, it is possible for a given gripping clamp to convey the container and transfer it to a further gripping clamp. WO 2007/144262 describes a gripping device for containers. In said document, one gripping clamp is provided which has two cooperating gripping regions that grip the containers from two sides. The movement of these gripping regions is in this case coupled to one another so that the actuation of one region also causes an actuation of the other region. The two gripping regions or jaws are in this case each formed in one piece with the cooperating means.

WO 00/76746 A1 discloses a gripper for transporting containers. Here, this gripper is arranged on a carrier and can be opened or closed by movements starting from this carrier.

U.S. Pat. No. 6,612,634 B1 discloses a further gripper for gripping preforms, two gripping jaws likewise being provided here on an actuation arm and a carrier plate, which gripping jaws grip the containers.

In the prior art, it is often desirable to change the gripping elements, for example, if they are worn or if other gripping elements are required for a different type of container.

It may therefore be desirable to provide a gripping element or a clamp which can quickly be changed, in order in this way to reduce the time required for a system changeover.

SUMMARY OF THE INVENTION

A gripping apparatus according to the disclosure for gripping containers may comprise a gripping element which has two gripping parts that can move relative to one another, wherein at least one portion of the container to be gripped can be received between these gripping parts. Furthermore, the gripping apparatus may comprise a carrier on which the gripping parts are arranged, wherein the gripping parts are pivotable in a predefined movement plane.

According to the disclosure, the gripping apparatus may comprise a detachment mechanism for detaching the gripping parts from the carrier, wherein this detachment mechanism can be actuated manually and without the aid of a tool in order to detach the gripping parts from the carrier.

According to some aspects, the detachment mechanism comprises a manually operated actuation element, through the actuation of which the gripping parts can be detached from the carrier.

While in the prior art the use of special installation tools, such as screwdrivers, is always required in order to detach the gripping parts from their carrier, in the embodiment according to the disclosure the gripping parts can be detached from the carrier without the use of a tool, e.g. in particular manually.

A pin-like body may be arranged on each gripping part, wherein the pin-like bodies extend essentially perpendicular to the movement plane of the gripping parts and the gripping parts are in each case pivotable about a pivot axis defined by the pin-like bodies. The plane in which the gripping parts are pivotable may also be the plane in which the gripping parts extend. This may be an essentially horizontal plane. Here, essentially perpendicular is understood to mean that a longitudinal direction of the pin-like bodies extends at an angle of between 80° and 100° and, in some aspects, between 85° and 95° relative to the movement plane.

The gripping parts may be jaws or claws, between which a container and in particular a neck of the container can be received. In order to be able to grip a container, it is possible to pivot the two gripping parts towards one another and away from one another.

An arrangement of the gripping parts on the carrier is understood to mean, for example, that the pin-like bodies can be pushed into this carrier. To change the gripping element, therefore, use is made of a mechanism by means of which the gripping parts and the pin-like bodies arranged thereon can be removed from the carrier. The pin-like bodies therefore serve on the one hand for moving the gripping parts (and for stabilising the movement thereof) and on the other hand also for arresting relative to the carrier. The pin-like bodies may be fixedly arranged on the gripping parts and serve for attaching the gripping parts to the carrier and for fixing the gripping parts at the correct height.

In one exemplary embodiment, a sleeve body is arranged around at least one region of each pin-like body. This sleeve body serves for guiding the pin-like body and thus also fixes the gripping parts in all directions in such a way that the latter in the installed state are pivotable essentially only about an axis of the respective pin-like bodies. The sleeve bodies may be arranged completely inside the carrier. The sleeve-like serve for pivoting the gripping parts. However, it would also be possible that the pin-like bodies are used to pivot the gripping parts therearound, so as to pass for example from an open position to a closed position of this gripping apparatus.

In an exemplary embodiment, at least one pin-like body can be displaced relative to its associated sleeve body in a longitudinal direction of the pin-like body. By virtue of this displacement, a detachment of the gripping parts from a carrier and thus a changeover of the gripping element can be achieved. For example, both pin-like bodies may be displaceable relative to the sleeve body. In this case, for changeover purposes, the two gripping parts may be simultaneously displaced relative to the sleeve body and thus also the carrier.

In an exemplary embodiment, at least one sleeve-like body has in at least one portion, for example, an end portion, a cross-section which differs from a circular shape. In this case, the torques on the gripping parts are transmitted via the sleeve-like bodies (and thus not or not just the pin-like bodies). The sleeve body may be rotated in this case, and with it the pin-like bodies. In some aspects, the sleeve body has a square portion.

It would also be possible that at least one pin-like body has in at least one portion a cross-section which differs from a circular shape. By means of this cross-section differing from the circular cross-section, it is possible to actuate the two pin-like bodies for the pivoting movements thereof. In some aspects, the pin-like body has an angular and in particular square cross-section in said region. The sleeve body may be rotated in this case, and with it the pin-like bodies. The pin-like bodies may be bolts which are formed fixedly and, in some aspects, in one piece with the respective gripping parts.

In an exemplary embodiment, the apparatus comprises engagement means which connect the sleeve bodies to the gripping parts so that they rotate together. Therefore, although a displacement of the gripping parts relative to the sleeve bodies is possible, the gripping parts are entrained in the event of a rotation of the sleeve bodies. Here, the engagement means may be for example an angular internal cross-section of the sleeve bodies which matches a corresponding angular external cross-section of the pin-like bodies. Furthermore, it would also be possible to provide in the gripping part an engagement groove, in which an (end) portion of the respective sleeve body engages. Conversely, it is also possible to provide in the gripping parts a protrusion which engages in a groove of the sleeve body.

In an exemplary embodiment, there is provided between the gripping parts a spring device which may draw the gripping parts together. However, it would also be possible to configure the spring device in the form of a compression spring which pushes the gripping parts away from one another.

In this embodiment, therefore, the gripping apparatus may be either a self-opening gripping apparatus, i.e. a gripping apparatus which is closed counter to the force of said spring device, for example, with a curved path, or a self-closing gripping apparatus.

In an exemplary embodiment, the sleeve bodies have cooperating engagement means or are connected to cooperating engagement means so that, in the event of a rotation of one sleeve body, the other sleeve body is also rotated. It is thus sufficient to actuate one of the two sleeve bodies in order to achieve an opening or closing of the gripping apparatus. In some aspects, these are meshing teeth or a tooth of one sleeve body which engages in a recess of the other sleeve body or of the other engagement means.

An actuation arm may be arranged on one sleeve body. This actuation arm may extend in a plane which is arranged parallel to the plane of the gripping part. By virtue of this actuation arm or a pivoting about the axis of the corresponding pin-like body, the gripping apparatus can be opened and closed.

The apparatus may comprise an actuation lever which cooperates with the actuation arm in order to bring about a pivoting movement of the latter. In this case, the actuation lever may be pivotable relative to the actuation arm. For example, the actuation lever is pivotable only by a small angle relative to the actuation arm, for example by an angle of 1°-10°, and in some aspects between 2° and 8°. By virtue of this slight pivotability, the curved paths can be managed more easily. The actuation arm may be arranged in a middle region of the pin-like body or of the shafts, i.e. in a middle region relative to the longitudinal direction of said pin-like bodies. In this way, a favourable force transmission for actuating the gripping elements is possible, since the pin-like bodies are guided above and below the region of the actuation arm. The actuation arm may extend in a plane which is parallel to the movement plane of the gripping parts.

In an exemplary embodiment, the actuation lever is loaded by a spring device.

In an exemplary embodiment, the gripping apparatus comprises a magnetic holding means for attaching the gripping parts to the carrier. In this case, the arresting of the gripping parts, or of a holder which carries these gripping parts, takes place by means of magnetic forces.

In an exemplary embodiment, the gripping apparatus comprises a connection element arranged between the gripping parts and the carrier, wherein this connection element can be manually detached at least from the gripping parts or from the carrier. More specifically, this connection element may be arranged on a holder, the gripping parts also being arranged on this holder. This holder can be detached from the carrier.

In an exemplary embodiment, a first latching means is provided on the carrier, which first latching means (in the assembled state) cooperates with a second latching means provided on at least one pin-like body. With the aid of these latching means, a quick detachment of the pin-like bodies and thus also of the gripping parts can be achieved. In this way, a quick-change system can be provided.

In an exemplary embodiment, a groove is arranged in an upper portion of the pin-like bodies, i.e. in that region of the pin-like bodies which is located opposite the gripping parts, in which groove there engages a region of this first latching means. In this way it is possible to arrest the pin-like bodies in their longitudinal direction.

In an exemplary embodiment, the pin-like bodies can rotate relative to the first engagement means. In this way, the rotational movement of the pin-like bodies and thus also of the gripping parts is not inhibited by the second latching means.

In an exemplary embodiment, the first engagement means is pretensioned relative to the pin-like body by means of a spring device. This means that the force of this spring device must be counteracted in order to detach the gripping parts.

In an exemplary embodiment, the pin-like bodies are pretensioned relative to the carrier by means of at least one pretensioning device.

In an exemplary embodiment, the engagement means are spaced apart from the pin-like bodies in a radial direction of the pin-like bodies, around the entire circumference thereof. In this way, the pin-like bodies can easily be displaced relative to the engagement means in order to change the gripping parts.

In an exemplary embodiment, the latching means for arresting the pin-like bodies in the carrier and the engagement means for rotating the gripping parts are formed at a distance from one another and separately from one another.

The present disclosure also relates to a transport device comprising a plurality of gripping apparatuses of the type described above. In this case it is possible that the individual gripping apparatuses are arranged for example on a transport chain. However, it would also be possible for a plurality of gripping apparatuses of the type described above to be provided for example on a transfer starwheel.

Further advantages and embodiments will emerge from the appended drawings.

BRIEF DESCRIPTION OF THE DRAWINGS

In the drawings:

FIG. 1 shows an overall view of a gripping apparatus according to the disclosure;

FIG. 2 shows a partial view of the gripping apparatus of FIG. 1;

FIG. 3 shows a sectional view of the gripping apparatus of FIG. 2;

FIG. 16 shows two views of the gripping apparatus to illustrate different perspectives;

FIG. 17 shows a sectional view of the gripping apparatus of FIG. 16 along the line A-A in FIG. 16;

FIG. 18 shows a sectional view of the gripping apparatus of FIG. 16 along the line B-B in FIG. 16;

DETAILED DESCRIPTION

Figure 4:
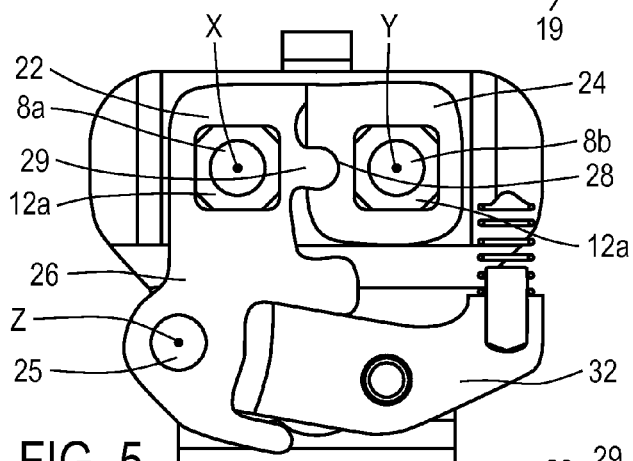
FIG. 4 shows a plan view of the section from FIG. 3.

FIG. 1 shows an apparatus 1 according to the disclosure for gripping containers. This apparatus comprises a carrier 54, on which there is arranged a slide 52 which can be displaced in the direction L relative to this carrier 54. In this way, it is possible for a carrier 6 arranged on the slide 52 and having a gripping clamp 2 to be displaced by means of a curved path. The gripping apparatus shown in FIG. 1 is suitable, for example, for transfer starwheels which grip the containers at their necks and pass said containers to further transfer units. Reference 46 denotes an actuation element, by means of which the user can manually detach the gripping element quickly from the carrier 6.

FIG. 2 shows a detailed view of the gripping apparatus of FIG. 1. It can be seen that the carrier comprises a closure plate 62 which is attached to the carrier by means of screws 64. However, in order to change the gripping element 2, it is not necessary to lift off this plate, but rather said changing takes place, as mentioned above, simply by pressing the actuation element 46. References 2a, 2b denote gripping parts of the gripping element 2, which can receive the necks of the containers. These two gripping parts are pivotable in a movement plane.

FIG. 3 shows a further detailed view of the apparatus in partial cross-section. It can now be seen that the gripping parts 2a, 2b, which form part of the gripping element 2 shown in FIGS. 1-2, are in each case fixedly connected to a pin-like body 8a, 8b and can be rotated or pivoted simultaneously with these about the axes X, Y. In this case it is possible that the pin-like bodies or the lower ends thereof are pressed into the gripping parts 2a, 2b.

References 12a and 12b denote sleeve bodies which are arranged around the pin-like bodies 8a, 8b and which can likewise be rotated together with the pin-like bodies 8a, 8b. Reference 42 denotes a latching means which engages in a corresponding circumferential groove 14 of the pin-like bodies 8a, 8b. Furthermore, the pin-like bodies are biased in the downward direction in FIG. 3 via spring devices 48 and plates 47.

FIG. 4 shows a further sectional view of a gripping apparatus according to the disclosure. Reference 16 denotes a spring which pushes the two gripping parts 2a and 2b away from one another. The movement plane of the two gripping parts is perpendicular to the plane of the figure in FIG. 4. The carrier 6 has a horizontal recess 15, in which engagement means 22 and 24 are provided which serve for rotating or pivoting the pin-like bodies 8a and 8b and thus also the gripping parts 2a and 2b. It can be seen that the sleeve bodies 12a and 12b engage at their lower end in a circumferential groove 19 formed between the pin-like bodies 8a and 8b and the gripping parts 2a and 2b.

By virtue of this engagement, the sleeve bodies 12a, 12b and the gripping parts 2a and 2b are connected to one another in such a way as to rotate together. At the same time, the sleeve bodies 12a and 12b serve for guiding the pin-like bodies 8a, 8b. The pin-like bodies 8a, 8b have a tapering upper end 17 which, as mentioned above, is biased in the downward direction in FIG. 4 by the spring device 48. The spring device 48 is in turn supported against the abovementioned closure plate 62. The sleeve-like bodies 12a, 12b have steps 13, above which the engagement means 22, 24 engage or against which the engagement means 22, 24 are supported. Here, the sleeve body 12a, 12b has in each case above the step 13 an angled external cross-section, so that it can be rotated by a rotational movement of the actuation arms 22, 24.

Figure 5:
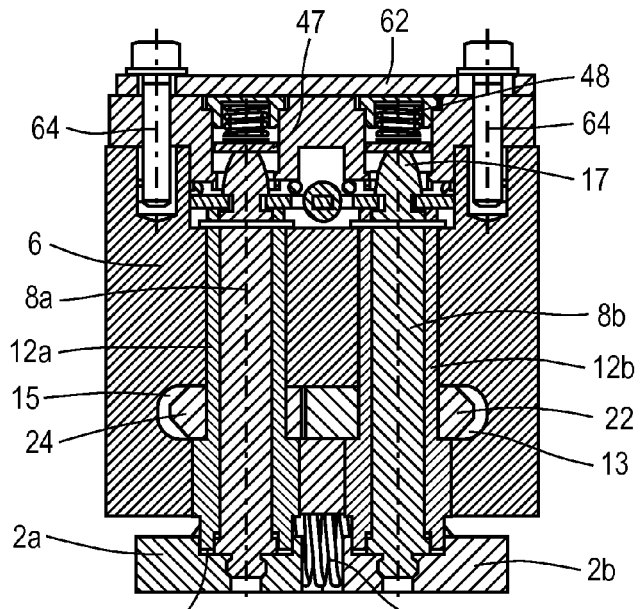
FIG. 5 shows a detail view of the gripping apparatus according to the disclosure.

FIG. 5 shows a plan view of the apparatus in the region in which the rotation of the sleeve bodies 12a, 12b and thus also of the pin-like bodies 8a, 8b is brought about. It can be seen that in this region the sleeve bodies 12a, 12b have an essentially square external cross-section. The engagement means accordingly have a square internal cross-section. Reference 26 denotes an actuation arm, by means of which the sleeve 12a can be rotated. This actuation arm 26 is formed in one piece with the engagement means 22.

Provided on this actuation arm 26 is a protrusion 29 which engages in a recess 28 of a second engagement means 24. In this way, the actuation arm 26 can be pivoted about the pivot axis X and thus at the same time the engagement means 24 is pivoted about the axis Y. However, it would also be possible to form the actuation arm 26 in one piece with the sleeve body 12a.

It would also be possible that a groove or an engagement means is provided on the actuation arm 26 or the engagement means 22, and instead a protrusion is provided on the second engagement means 24.

Reference 32 denotes an actuation lever which is in turn connected to the actuation arm 26.

Figure 6:
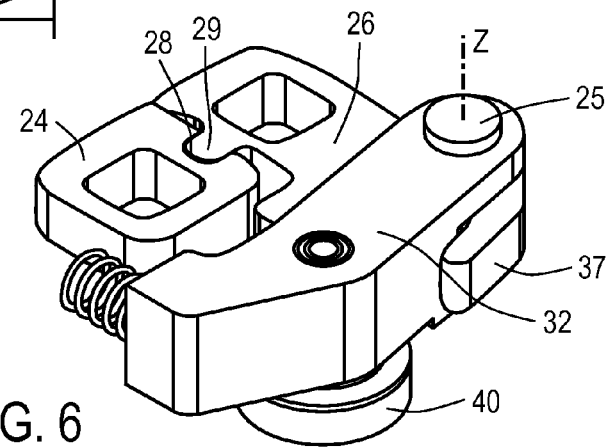
FIG. 6 shows a perspective view of the detail of the gripping apparatus shown in FIG. 5.

FIG. 6 shows a perspective view of the actuation unit described in FIG. 6. It can be seen here that the actuation arm 26 and the actuation lever 32 are likewise connected to one another via a pivoting device 25 which allows a slight pivoting of the actuation lever 32 relative to the actuation arm 26. More specifically, the actuation lever 32 is pivotable about the axis Z to a small degree relative to the actuation arm 26. Reference 40 denotes a control element which is arranged on the actuation lever 32 and which can be guided for example by a curved path in order to open and close the gripping apparatus.

In this case it is possible that this control element 40 is arranged such that it can rotate relative to the actuation lever 32.

Figure 7:
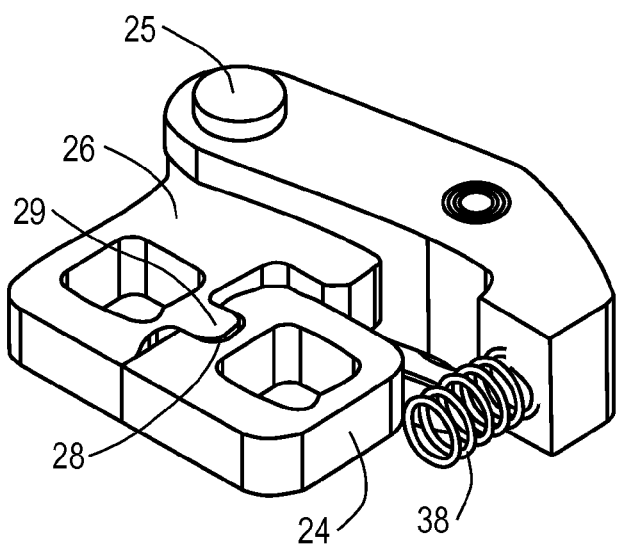
FIG. 7 shows a further perspective view of the detail of the gripping apparatus shown in FIG. 5.

FIG. 7 shows a further perspective view of the unit shown in FIG. 6. Here, it is possible to see the spring unit 38 which in this case biases the gripping parts 2a and 2b in the direction of the closed position, i.e. counter to the force of the spring 16.

In the arrangements shown in the figures, therefore, two springs are provided which act against one another.

Figure 8:
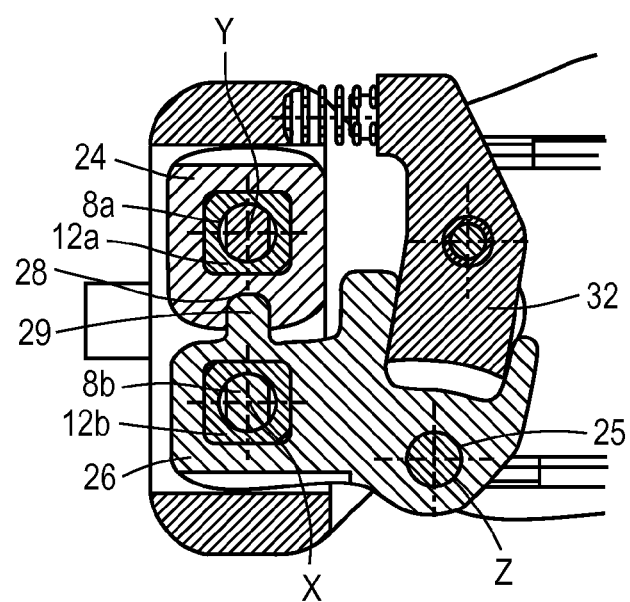
FIG. 8 shows a further view to illustrate a gripping apparatus according to the disclosure.

FIG. 8 shows a further detailed view of the apparatus according to the disclosure. Here too, it is possible to see that an actuation of the actuation arm 26 at the same time also results in the actuation of the engagement element 24. Here, the pivot axes defined by the pin-like bodies 8b and 8a are stationary, whereas the further pivot axis Z, about which the actuation lever 32 can pivot relative to the actuation arm 26, is not stationary.

Figure 9:
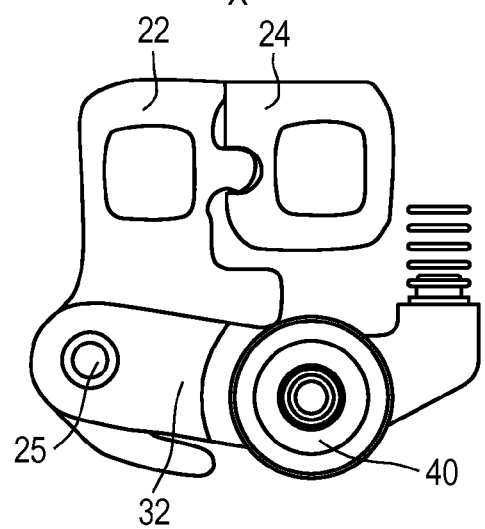
FIG. 9 shows a view of the detail of FIG. 8 from below.
Figure 10:
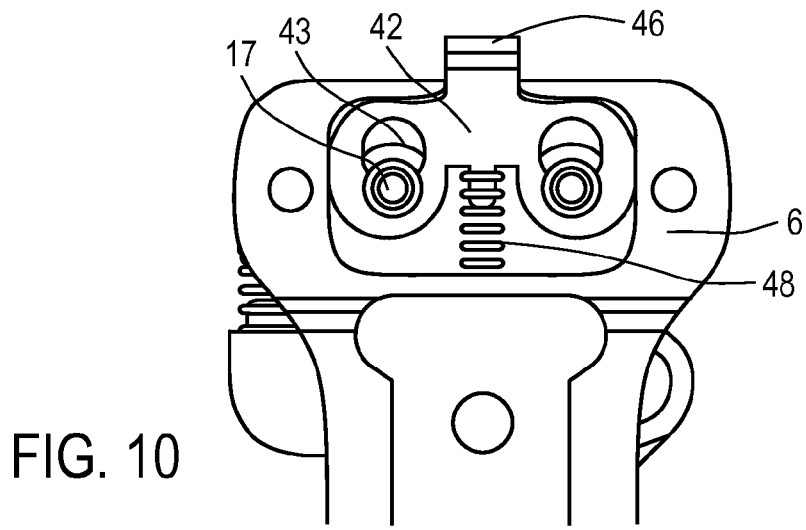
FIG. 10 shows a further detail of the gripping apparatus according to the disclosure.

FIG. 9 schematically shows the apparatus of FIG. 8 in a view from below. Here too, it is again possible to see the control element 40 which is used to open and close the clamp. FIG. 10 shows the mechanism which is used to detach the gripping element 2 from the carrier 6. This mechanism comprises a latching means 42 which is arranged on the carrier 6. This latching means 42 has an opening 43 which, as shown in FIG. 10, widens in one direction. By pushing the actuation element 46 counter to the force of the spring 48, the latching means 42 can be displaced downwards in FIG. 10 and in this way the heads 17 are located above the openings 43. In this situation, the ends 17 of the pin-like bodies can be released and pulled out in the downward direction.

Figure 11:
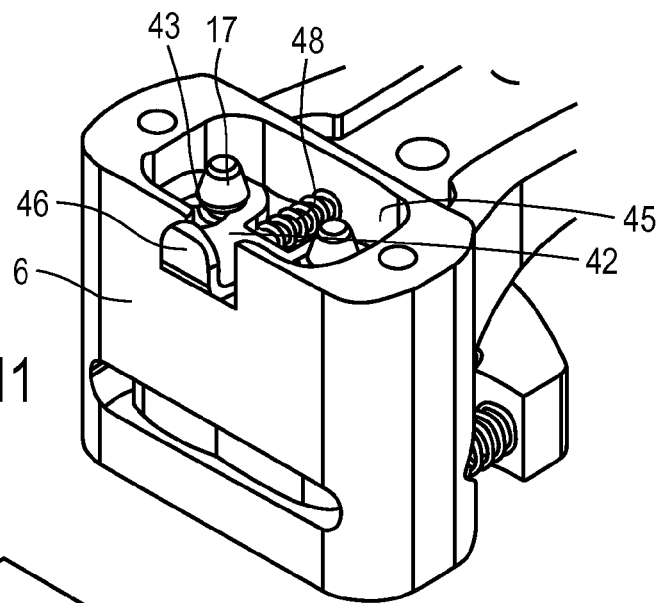
FIG. 11 shows a perspective view of a gripping apparatus according to the disclosure.

FIG. 11 shows a perspective view of the opening mechanism. Here too, it can be seen that the engagement between the latching means 42 and the ends 17 of the pin-like bodies 8a, 8b can be released by pressing the actuation element 46. Here, the latching means is arranged in a recess 45. As mentioned above, a spring means is provided in each case above the ends 17, which spring means biases the ends 17 and thus also the pin-like bodies 8 in the downward direction.

Figure 12:
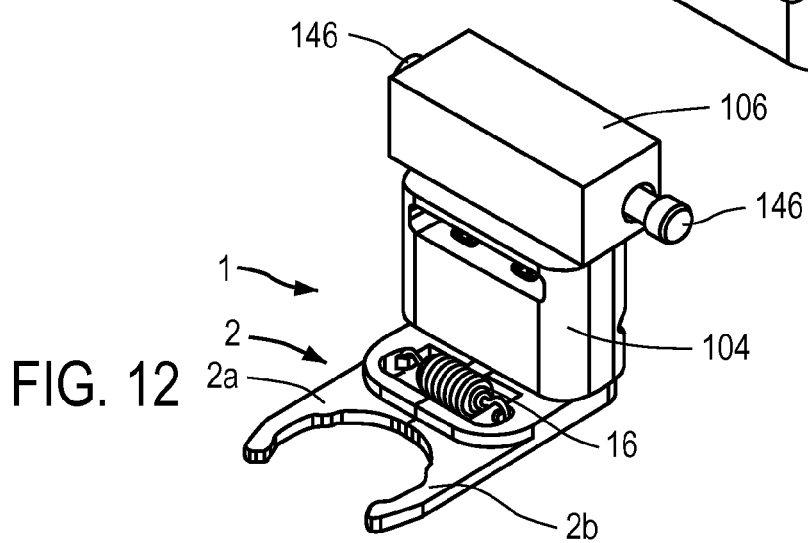
FIG. 12 shows an overall view of a gripping apparatus according to the disclosure in a further embodiment.
Figure 13:
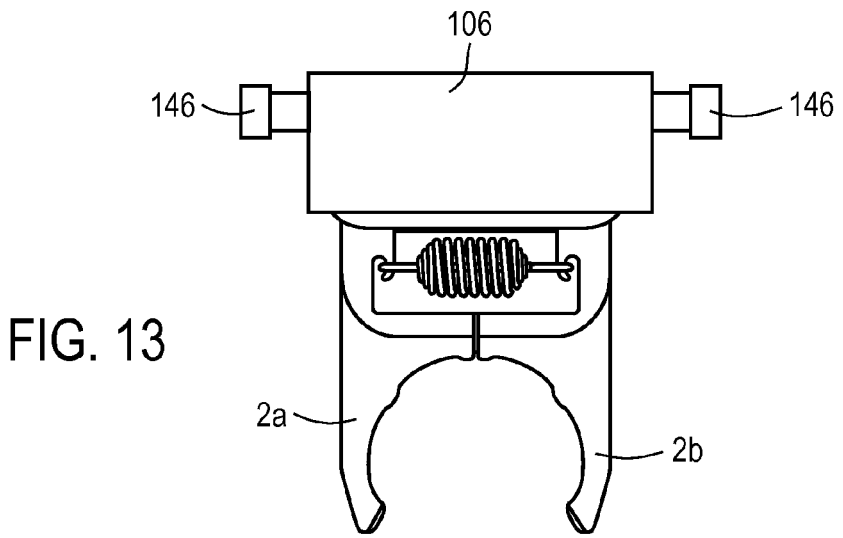
FIG. 13 shows a plan view of the apparatus of FIG. 12.

FIGS. 12 and 13 show a further embodiment of a gripping apparatus 1 according to the disclosure. The gripping parts 2a, 2b themselves are in this case configured in a manner similar to that in the embodiment described above. However, the arresting mechanism is configured differently here. The two gripping parts 2a, 2b are pivotable here, but are arranged on a holder 104 in a non-detachable manner. This holder is configured here in a manner similar to that of the carrier 6 in the previous embodiments; in particular, the pivoting movement of the gripping parts is generated in a similar manner.

In the embodiment shown in FIGS. 12 and 13, however, the holder 104 is arranged on a carrier 106 in such a way that it can be detached together with the gripping parts 2a, 2b. In order to detach the holder 104 from the carrier 106, two actuation elements 146 are provided which can be pressed together.

Figure 14:
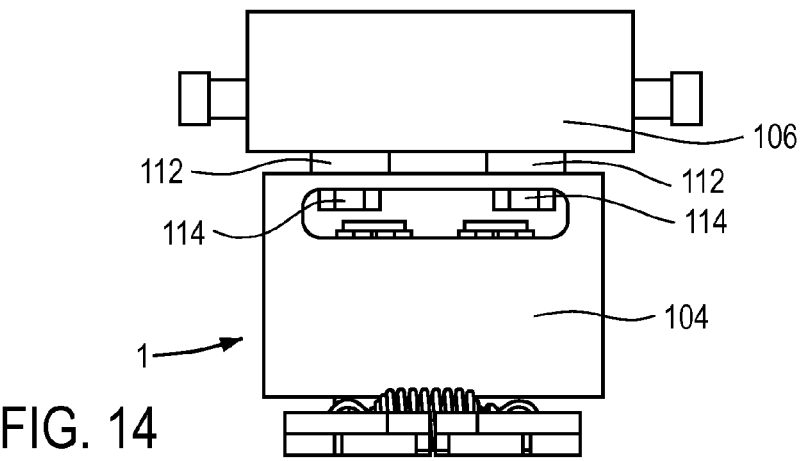
FIG. 14 shows a front view of the gripping apparatus of FIG. 12.
Figure 15:
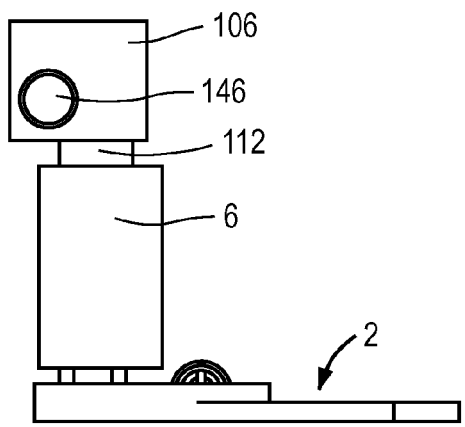
FIG. 15 shows a side view of the gripping apparatus of FIG. 12.

FIG. 14 shows a front view of a gripping apparatus according to the disclosure. In this view, it is possible to see connection elements 112 which are fixedly arranged on the holder 104 by means of screws 114. These connection elements are detachably arranged on the carrier 106. In the diagram shown in FIG. 15, it can be seen that the connection elements 112 are offset laterally relative to the actuation element 146.

Figure 19:
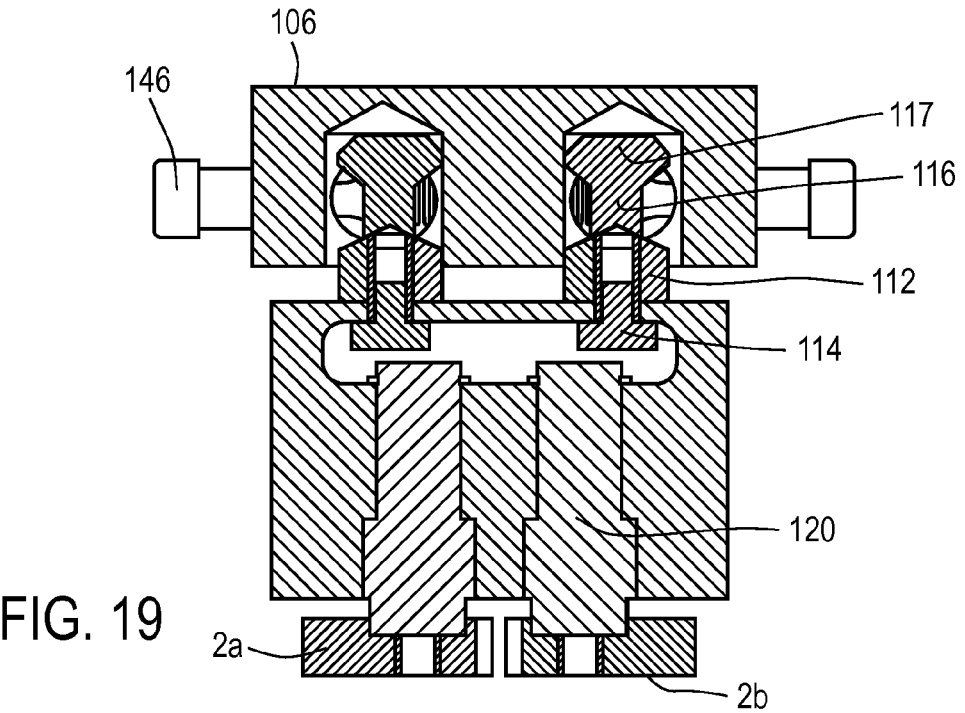
FIG. 19 shows a sectional view of the gripping apparatus of FIG. 16 along the line C-C in FIG. 16.

FIG. 16 shows two views of the gripping apparatus 1 shown in FIG. 12 to illustrate the cross-sections shown in FIGS. 17-19. FIG. 17 shows a cross-section along the line C-C in FIG. 16. It is possible to see here in particular the elements arranged in the interior of the carrier 106. The two actuation elements 146 can be pressed together and in the process act on arresting bodies 144 which can likewise be displaced in the direction R relative to the carrier 106. A spring 148 pushes these two arresting bodies 144 apart. In this pushed-apart situation, an arresting of the holder 104 on the carrier 106 is ensured.

More specifically, the two arresting bodies 144 have arresting portions 150 with a recess 152 in each case which extends in a circumferential direction of the arresting bodies 144. This recess can be displaced relative to heads 117 which form part of the connection elements 112. Only if the two actuation elements 146 are pressed can the holder 104 accordingly be detached from the carrier 106. In this way it is possible to trigger an intentional release of the connection.

FIG. 18 shows a cross-section along the line B-B in FIG. 16. Here, reference 128 denotes a recess in which the two screws 114 for attaching the connection elements 112 can be arranged.

FIG. 19 shows a cross-section along the line A-A in FIG. 16. Here, pin-like bodies 120 are again provided which are fixedly arranged on the gripping parts 2a, 2b and serve for pivoting these gripping parts 2a, 2b. In this embodiment, these pin-like bodies also perform the function of the sleeve-like bodies in the embodiment shown in FIGS. 1-11, i.e. the gripping parts 2a, 2b are pivoted by a rotation of these two pin-like bodies 120. The pin-like bodies may be designed here either as hollow bodies or as solid bodies. Unlike in the above embodiments, however, the pin-like bodies 120 do not have the task of forming an arresting and release mechanism. The rotation of the pin-like bodies takes place as illustrated in FIGS. 4-6.

In the embodiment shown in FIGS. 12-19, the connection elements 112 are arranged fixedly on the holder 104 and detachably on the carrier 106. However, it would also be possible to provide the connection elements 112 fixedly on the carrier 106 and detachably on the holder 104. It would also be possible for one connection element to be provided fixedly on the holder 104 and for another connection element to be provided fixedly on the carrier 106.

Figure 20:
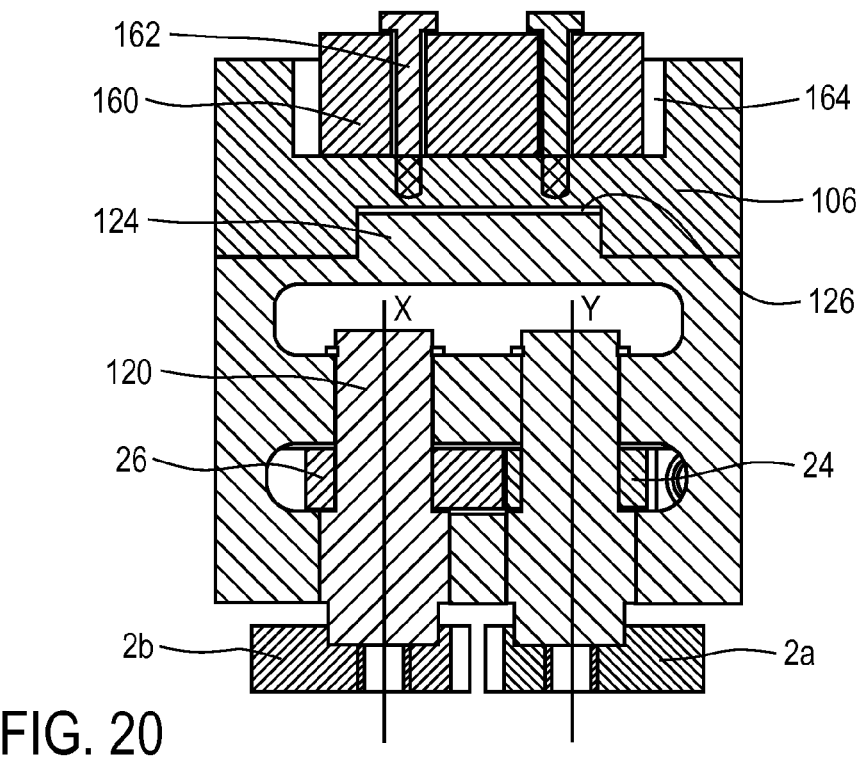
FIG. 20 shows a sectional view of a gripping apparatus according to the disclosure in a further embodiment.

FIG. 20 shows a further embodiment of a gripping apparatus according to the disclosure. Here, the gripping parts 2a, 2b and the holder are configured in a manner similar to that in the embodiment shown in FIGS. 12-19. However, the arresting mechanism with the carrier 106 is configured differently here.

Provided on the holder is a protrusion 124 which protrudes into a recess 126 formed in the carrier 106. The collaboration between this protrusion 124 and this recess 126 defines the position of the carrier 106 relative to the holder 104. Reference 160 denotes a magnet, for example, a permanent magnet which is arranged in a recess 164 of the carrier 106. This magnet 160 attracts the holder 104, which is formed at least partially of a magnetic or magnetisable material, and in this way fixes the holder 104 on the carrier 106.

It is thus possible to detach the holder 104 with the gripping parts 2a, 2b from the carrier 106 by overcoming the magnetic attraction force. The magnet 160 is in this case arranged fixedly in the recess 164 by means of screws 162. However, it would also be possible to configure a region of the holder 104 as a permanent magnet.

In a further embodiment, an actuation element (not shown) is provided, by means of which the position of the magnet 160 within the recess 164 can be varied; for example, the magnet 160 can be raised within the recess 164. In this way, the magnetic force between the magnet 160 and the holder 104 can be reduced and then the remaining magnetic force can be overcome more easily in order to detach the holder 104 from the carrier 106.

It will be apparent to those skilled in the art that various modifications and variations can be made to the gripping element for transporting containers of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. Gripping apparatus for gripping containers, comprising:
   a gripping element having two gripping parts movable relative to one another, said gripping parts being configured to receive at least one portion of a container to be gripped between the gripping parts;
   a pin-like body arranged on each gripping part, each of the gripping parts being pivotable about a pivot axis defined by an associated pin-like body;
   a sleeve body arranged around at least one region of each pin-like body, wherein at least one of said pin-like bodies can be displaced relative to the sleeve body arranged around said at least one pin-like body in a longitudinal direction of said at least one pin-like body;
   a carrier, the gripping parts being arranged on the carrier, the gripping parts being pivotable in a predefined movement plane; and
   a detachment mechanism for detaching the gripping parts from the carrier, the detachment mechanism being configured to be actuated manually and without the aid of a tool in order to detach the gripping parts from the carrier.

2. Gripping apparatus according to claim 1, wherein the detachment mechanism comprises a manually-operated actuation element, said gripping parts being detachable from the carrier by actuation of said actuation element.

3. Gripping apparatus according to claim 1, wherein at least one pin-like body or one sleeve body has in at least one portion a noncircular cross-section.

4. Gripping apparatus according to claim 1, further comprising engagement means which connect the sleeve bodies to the gripping parts so that they rotate together.

5. Gripping apparatus according to claim 1, further comprising cooperating engagement means on the sleeve bodies so that, in the event of a rotation of one sleeve body, the other sleeve body is also rotated.

6. Gripping apparatus according to claim 5, wherein the engagement means are spaced apart from the pin-like bodies in a radial direction of the pin-like bodies around the entire circumference thereof.

7. Gripping apparatus according to claim 1, further comprising an actuation arm arranged on one of said sleeve bodies.

8. Gripping apparatus according to claim 7, further comprising an actuation lever which cooperates with the actuation arm in order to bring about a pivoting movement of the actuation arm.

9. Gripping apparatus according to claim 8, wherein the actuation lever is configured such that it can pivot relative to the actuation arm.

10. Gripping apparatus according to claim 1, further comprising a magnetic holding means for attaching the gripping parts to the carrier.

11. Gripping apparatus according to claim 1, further comprising a connection element arranged between the gripping parts and the carrier, said connection element being manually detachable from at least one of the gripping parts and the carrier.

12. Gripping apparatus according to claim 1, further comprising a first latching means on the carrier, said first latching means cooperating with a second latching means provided on at least one of said pin-like bodies or on a connection element.

13. Gripping apparatus according to claim 12, wherein the first latching means is pretensioned relative to the pin-like body by means of a spring device.

14. Gripping apparatus for gripping containers, comprising:
    a carrier;
    a first pin-like body having a first longitudinal axis, said first pin-like body being arranged on the carrier for rotation about the first longitudinal axis;
    a second pin-like body having a second longitudinal axis, said second pin-like body being arranged on the carrier for rotation about the second longitudinal axis;
    a gripper having two gripping parts movable relative to one another in a predefined movement plane, said gripping parts being configured to receive at least one portion of a container to be gripped between the gripping parts, a first one of said two gripping parts being arranged on the first pin-like body, and a second one of said two gripping parts being arranged on the second pin-like body;
    a first sleeve arranged about at least a portion of the first pin-like body, said first sleeve being arranged on the carrier for rotation with the first pin-like body about the first longitudinal axis;
    a second sleeve arranged about at least a portion of the second pin-like body, said second sleeve being arranged on the carrier for rotation with the second pin-like body about the second longitudinal axis; and
    a detachment mechanism extending from the carrier, the detachment mechanism being manually actuatable from a latch position, which latches the gripper to the carrier, to a release position, which releases the gripper from the carrier.

15. The gripping apparatus of claim 14, wherein, when the detachment mechanism is manually actuated to the release position, the first pin-like body is permitted to move along the first longitudinal axis relative to the first sleeve and the second pin-like body is permitted to move along the second longitudinal axis relative to the second sleeve so as to remove the gripper from the carrier.

16. The gripping apparatus of claim 15, further comprising:
    a first spring configured to urge the first pin-like body along the first longitudinal axis relative to the first sleeve when the detachment mechanism is manually actuated to the release position; and
    a second spring configured to urge the second pin-like body along the second longitudinal axis relative to the second sleeve when the detachment mechanism is manually actuated to the release position.

17. Gripping apparatus for gripping containers, comprising:
    a gripping element having two gripping parts movable relative to one another, said gripping parts being configured to receive at least one portion of a container to be gripped between the gripping parts;
    a carrier, the gripping parts being arranged on the carrier, the gripping parts being pivotable in a predefined movement plane;
    a magnetic holding means for attaching the gripping parts to the carrier; and
    a detachment mechanism for detaching the gripping parts from the carrier, the detachment mechanism being configured to be actuated manually and without the aid of a tool in order to detach the gripping parts from the carrier.

18. Gripping apparatus for gripping containers, comprising:
    a gripping element having two gripping parts movable relative to one another, said gripping parts being configured to receive at least one portion of a container to be gripped between the gripping parts;

a holder, the gripping parts being arranged on the holder, the gripping parts being pivotable in a predefined movement plane, the holder being arranged on a carrier in such a way that the holder is detachable from the carrier together with the gripping parts;

a magnetic holding means for attaching the gripping parts arranged on the holder to the carrier; and a detachment mechanism for detaching the gripping parts arranged on the holder from the carrier, the detachment mechanism being configured to be actuated manually and without the aid of a tool in order to detach the gripping parts from the carrier.

* * * * *